United States Patent
Eisenhut et al.

(10) Patent No.: US 8,600,435 B2
(45) Date of Patent: Dec. 3, 2013

(54) MULTI-STANDARD TRANSCEIVER, DEVICE AND METHOD

(75) Inventors: Carsten Eisenhut, Mulheim an der Ruhr (DE); Peter Laaser, Munich (DE); Jens Kissing, Boenen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 133 days.

(21) Appl. No.: 13/087,928

(22) Filed: Apr. 15, 2011

(65) Prior Publication Data

US 2012/0264381 A1 Oct. 18, 2012

(51) Int. Cl.
*H04M 1/00* (2006.01)

(52) U.S. Cl.
USPC .................. 455/552.1; 455/67.11; 455/67.13

(58) Field of Classification Search
USPC .................. 455/552.1, 41.2, 570, 501, 67.11, 455/67.13, 76
See application file for complete search history.

(56) References Cited

U.S. PATENT DOCUMENTS

| | | | |
|---|---|---|---|
| 6,683,859 B1 | 1/2004 | Molnar et al. | |
| 6,704,349 B1 * | 3/2004 | Masenten | 375/219 |
| 6,813,311 B1 | 11/2004 | Pal et al. | |
| 2007/0298834 A1 | 12/2007 | Rofougaran | |
| 2008/0219377 A1 * | 9/2008 | Nisbet | 375/296 |
| 2009/0052683 A1 | 2/2009 | Schwingshackl et al. | |
| 2011/0223967 A9 * | 9/2011 | Rofougaran | 455/552.1 |
| 2011/0237188 A1 * | 9/2011 | Sen | 455/41.2 |

FOREIGN PATENT DOCUMENTS

DE 10053205 A1 5/2002

* cited by examiner

*Primary Examiner* — Ping Hsieh
(74) *Attorney, Agent, or Firm* — Eschweiler & Associates, LLC (57) ABSTRACT

A multi-standard transceiver includes a first subunit configured to perform signal processing according to a first communication standard and a second subunit configured to perform signal processing according to a second communication standard. Furthermore, the multi-standard transceiver includes an interference cancellation unit configured to drive an estimated interference signal from a first signal generated by the first subunit by performing the signal processing according to the first communication standard, and perform interference cancellation on a second signal generated by the second subunit by performing the signal processing according to the second communication standard based on the estimated interference signal.

22 Claims, 7 Drawing Sheets

MULTI-STANDARD TRANSCEIVER, DEVICE AND METHOD

FIELD

Embodiments of the present invention create a multi-standard transceiver for processing signals according to different communication standards, for example, to be used in wired or wireless communication systems. Further embodiments create devices performing interference cancellation.

BACKGROUND

Modern System-on-Chip (SoC) devices for mobile phone applications support various radio-standards like GSM, Bluetooth, FM radio.

Crosstalk can appear when two standards are operated in parallel. The harmonics of the transmit signal of standard A can fall into the receive band of standard B and can reduce the sensitivity of receive path B.

For example, the 9th harmonic of a 104 MHz FM radio transmit signal couples via the FMR-antenna to the GSM-antenna and falls into the receive band of the GSM 900 standard and reduces the sensitivity of a GSM receive signal located at 936 MHz.

SUMMARY

Embodiments of the present invention create a multi-standard transceiver comprising a first subunit configured to perform signal processing according to a first communication standard and a second subunit configured to perform signal processing according to a second communication standard. Furthermore, the multi-standard transceiver comprises an interference cancellation unit configured to derive an estimated interference signal from the first signal generated by the first subunit by performing the signal processing according to the first communication standard. Furthermore, the interference cancellation unit is configured to perform interference cancellation on a second signal generated by the second subunit by performing the signal processing according to the second communication standard based on the estimated interference signal.

Further embodiments of the present invention create a device comprising a first subunit configured to transmit a first communication signal at a transmit frequency and a second subunit configured to receive a second communication signal at a receive frequency. The first subunit and the second subunit are configured such that a relationship between the transmit frequency and the receive frequency varies. Furthermore, the device comprises an interference cancellation unit configured to survey the relationship (between the transmit frequency and the receive frequency) and activate an interference cancellation if the relationship fulfills a predetermined condition.

Further embodiments of the present invention create a device comprising a first transceiver subunit, a second transceiver subunit and an interference cancellation unit coupled between the first transceiver subunit and the second transceiver subunit.

Further embodiments of the present invention create a device comprising a plurality of subunits, each of the subunits being configured to perform signal processing. Furthermore, the device comprises a control unit configured to selectively activate and deactivate each of the subunits and to activate an interference cancellation, if a combination of active subunits fulfills a predetermined condition.

BRIEF DESCRIPTION OF THE DRAWINGS

Embodiments of the present invention will be described in detail using the accompanying figures, in which.

DETAILED DESCRIPTION

Before embodiments will be described in detail using the accompanying figures, it is to be pointed out that the same or functionally equal elements will be provided with the same reference numbers and that a repeated description of elements provided with the same reference numbers is omitted. Hence, descriptions of elements provided with the same reference numbers are mutually exchangeable.

Figure 1:
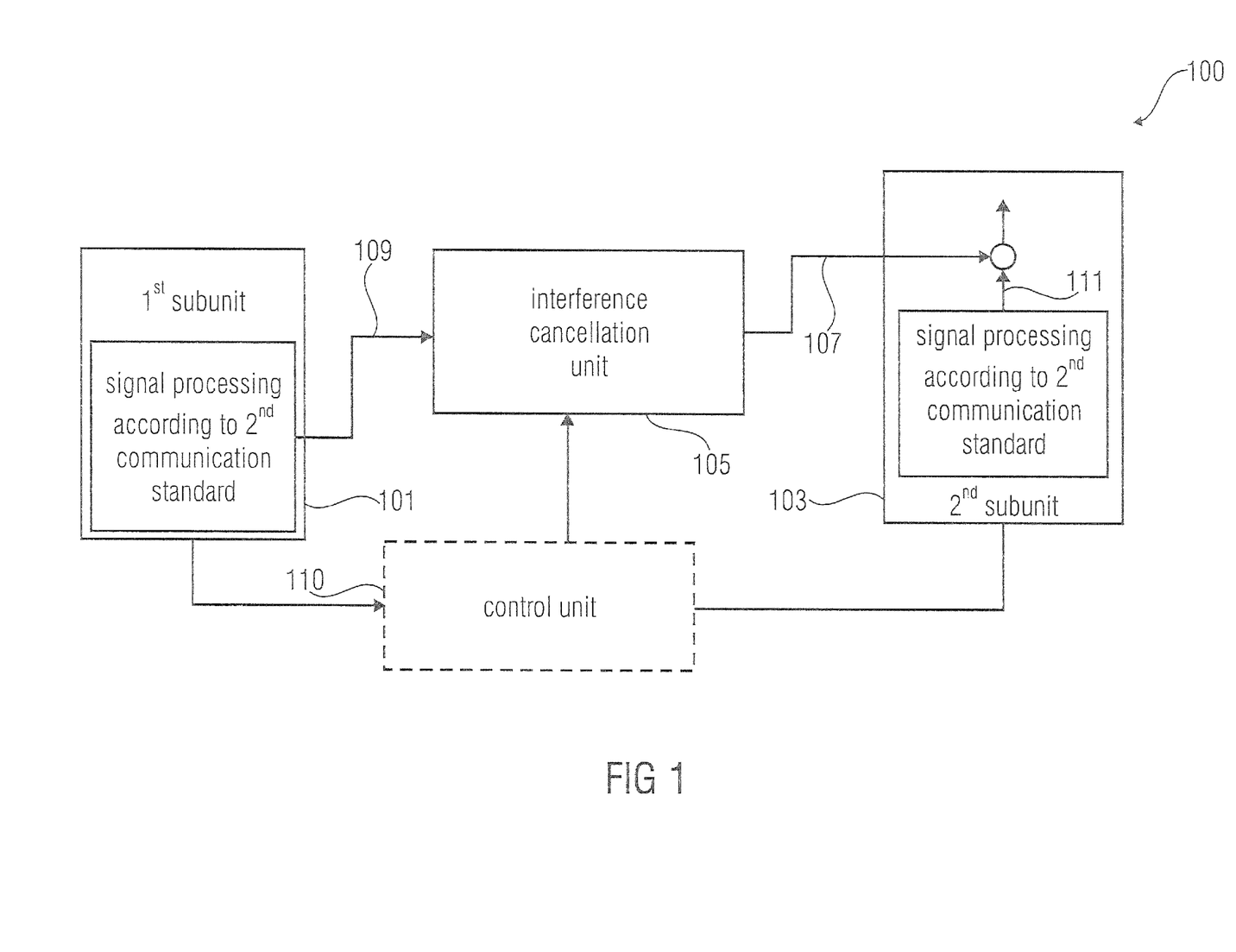
FIG. 1 shows a block schematic diagram of a multi-standard transceiver according to an embodiment.

FIG. 1 shows a block schematic diagram of a multi-standard transceiver 100 according to an embodiment.

The multi-standard transceiver 100 comprises a first subunit 101 configured to perform signal processing according to a first communication standard and a second subunit 103 configured to perform signal processing according to a second communication standard.

Furthermore, the multi-standard transceiver 100 comprises an interference cancellation unit 105 configured to derive an estimated interference signal 107 from a first signal 109 generated by the first subunit 101 by performing the signal processing according to the first communication standard. Furthermore, the interference cancellation unit 105 is configured to perform interference cancellation on a second signal 111 generated by the second subunit 103 by performing the signal processing according to the second communication standard based on the estimated interference signal 107.

It has been found that signal processing according to a first communication standard can influence a simultaneous or concurrent signal processing according to a second communication standard. As an example, the signal processing according to the first communication standard may generate the first signal 109 which may influence the second signal 111 generated by the signal processing according to the second communication standard. As an example, a frequency or a harmonic of the first signal 109 may fall into a passband for the second signal 111 and therefore may influence the second signal 111. In the case of the second signal 111 being a receive signal, the first signal 109 may influence the second signal 111 such that a sensitivity for the second signal 111 in the second subunit 103 is decreased. By performing the interference cancellation using the interference cancellation unit 105 the influence of the first signal 109 on the second signal 111 can be reduced or even canceled.

Furthermore, the second signal 111 may be a transmit signal according to the second communication standard, which is to be sent by the multi-standard transceiver 100 and onto which the first signal 109 or a harmonic of the first signal 109 would be superpositioned without the interference cancellation performed by the interference cancellation unit 105 and therefore would reduce the signal quality of the transmit signal. Although in embodiments the superposition between the first signal 109 or its harmonics and the second signal 111 may occur, countermeasures are taken by the interference cancellation unit by performing the interference cancellation using the estimated interference signal 107 based on the first signal 109, such that the effect of the superposition can be reduced or even canceled.

The first signal 109, for example, may be a transmit signal according to the first communication standard, which is to be transmitted by the multi-standard transceiver 100. Furthermore, the first signal 109 may be a baseband signal based on which the interference cancellation unit 105 derives the estimated interference cancellation signal 107. It is not necessary that the first signal 109 itself influences the second signal 111, for example, the first signal 109 in the baseband may get upmixed to a transmit frequency of the first communication standard and this transmit frequency or a harmonic of this transmit frequency may fall in a passband for the second communication standard. Nevertheless, the interference cancellation can be performed (based on the first signal 109) using the interference cancellation unit 105 in the baseband, which needs a much lower effort than performing the interference cancellation at the high signal transmission frequencies.

Furthermore, the first signal 109 may be an internal signal used in the first subunit for performing the signal processing according to the first communication standard, for example, a clock signal generated or used by an oscillator (for example, by a digitally controlled oscillator (DCO) or a PLL (phase locked loop)) or a synthesizer signal, which is used to upmix a baseband signal to a transmit frequency or for downmixing a communication signal from a received frequency to the baseband. A frequency or a harmonic of the synthesizer signal may fall into a passband of the second communication standard, for example, the synthesizer frequency or a harmonic of it may be equal or similar to a synthesizer frequency used in the second communication standard, such that the signal processing according to the first communication standard may influence the signal processing according to the second communication standard. Therefore, the interference cancellation unit 105 may derive the estimated interference signal 107 from different types of signals generated in the first subunit 101 by the signal processing according to the first communication standard, which may influence the signal processing according to the second communication standard.

Compared to a receive signal the first signal 109 is typically known in the system, such that the interference cancellation unit 105 can derive the estimated interference signal 107 based on the known first signal 109.

According to further embodiments, the multi-standard transceiver 100 may comprise a control unit 110 which is configured to activate and deactivate the interference cancellation unit 105. The control unit 110 may activate the interference cancellation unit 105 if a crosstalk condition between the signal processing according to the first communication standard and the signal processing according to the second communication standard is fulfilled. As an example, the control unit 110 may activate the interference cancellation unit 105 if a frequency of a signal generated by the signal processing according to the first communication standard or a harmonic of this frequency is equal to or similar to a frequency of a signal used in the second subunit by performing the signal processing according to the second communication standard.

As an example, if frequencies of signals generated by performing the signal processing according to the first communication standard or harmonics of these frequencies are not similar or equal to frequencies of signals generated in the second subunit by performing the signal processing according to the second communication standard, the control unit 110 may deactivate the interference cancellation unit 105.

Furthermore, the control unit 110 may be configured to selectively activate and deactivate the first subunit 101 and the second unit 103 and to activate the interference cancellation unit 105 if the first subunit 101 and the second subunit 103 are activated concurrently. In other words, the multi-standard transceiver may perform the signal processing according to the first communication standard and the signal processing according to the second communication standard independent from each other. The control unit 110 may only activate the interference cancellation 105 if both subunits 101, 103 are activated simultaneously, for example, because the signal processing according to the first communication standard influences the signal processing according to the second communication standard.

In general, the first communication standard and the second communication standard may be wired or wireless communication standards. Furthermore, one of the communication standards may be a wired communication standard, while the other communication standard is a wireless communication standard. The two communication standards, for example, may differ in communication protocols used, modulation schemes, data rates, signal output power, signal input power, transmit frequencies, or reception frequencies.

For example, the communication standards may be chosen from a group consisting of:

DSL (digital subscriber line), Ethernet, Bluetooth, WLAN (wireless local area network), GSM (global standard for mobile communication), UMTS (universal mobile telecommunication system), LTE (long-term evolution), DVB (digital video broadcasting), DAB (digital audio broadcasting), FM radio (FM—frequency modulation), AM radio (AM—amplitude modulation). The first and the second communication standard may be different from each other.

Figure 2:
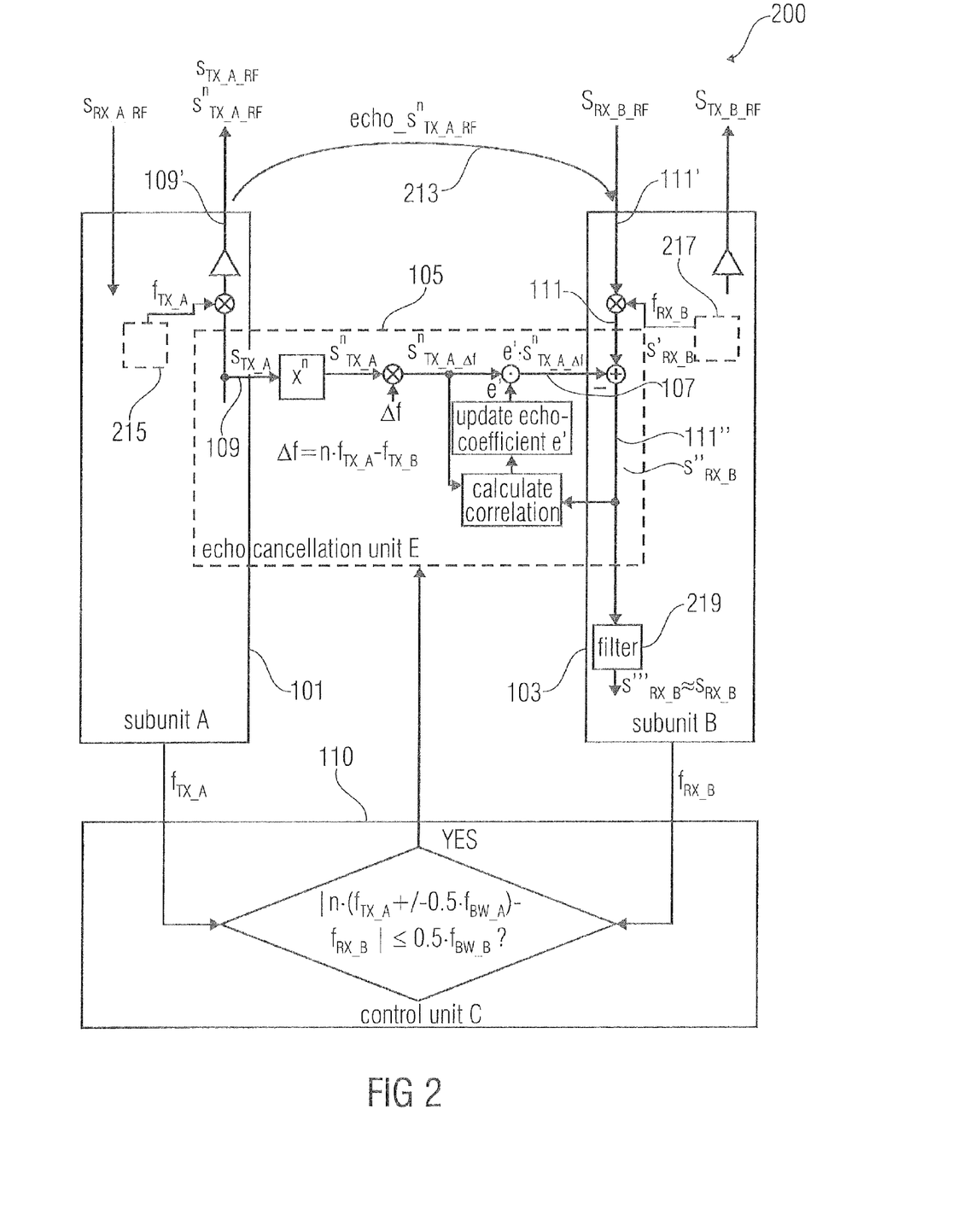
FIG. 2 a block schematic diagram of a possible implementation of the multi-standard transceiver from FIG. 1 according to an embodiment.

FIG. 2 shows a block schematic diagram of a multi-standard transceiver 200 as a possible implementation of the multi-standard transceiver 100 as a further embodiment.

The abbreviations used in FIG. 2 represent different signals, as follows:

Wanted transmit signal A in baseband and RF domain:

$$s_{TX\_A}, s_{TX\_A\_RF};$$

Unwanted $n^{th}$ harmonic of transmit signal A in RF domain:

$$s^n_{TX\_A\_RF};$$

Overall transmit signal A in RF domain:

$$s_{TX\_A\_RF} + s^n_{TX\_A\_R};$$

Echoed $n^{th}$ harmonic of transmit signal A within frequency band B in RF and baseband domain:

$$echo\_s^n_{TX\_A\_RF}, echo\_s^n_{TX\_A};$$

$N^{th}$ harmonic of wanted transmit signal A in baseband:

$$s^n_{TX\_A};$$

Frequency shifted $n^{th}$ harmonic of wanted transmit signal A:

$$s^n_{TX\_A\_\Delta f} = s^n_{TX\_A} \cdot \cos(2\pi \Delta f t)$$

whereas Δf is defined as:

$$\Delta f = n \cdot f_{TX\_A} - f_{TX\_B};$$

Estimated echo signal:

$$e' \cdot s''_{TX\_A\_\Delta f};$$

Wanted receive signal B in RF and baseband domain:

$$s_{RX\_B\_RF}, s_{RX\_B};$$

Overall receive signal in baseband domain:

$$s'_{RX\_B} = s_{RX\_B} + \text{echo}\_s''_{TX\_A};$$

Receive signal after echo cancellation:

$$s''_{RX\_B} = s'_{RX\_B} - e' \cdot s''_{TX\_A\_\Delta f};$$

Receive signal after filtering:

$$s'''_{RX\_B} = FIL(s''_{RX\_B}).$$

The multi-standard transceiver 200 comprises the first subunit 101 (also designated as subunit A), the second subunit 103 (also designated as subunit B), the control unit 110 (also designated as control unit C), and the interference cancellation unit 105 (also designated as echo cancellation unit E).

The first subunit 101 is configured to perform signal processing according to a first communication standard, the second subunit 103 is configured to perform signal processing according to a second communication standard.

In the first subunit 101 the first signal 109 is generated by performing the signal processing according to the first communication standard and in the second subunit 103 the second signal 111 is generated by performing the signal processing according to the second communication standard.

The second subunit 103 generates the second signal 111 in the baseband by downmixing a second communication signal 111' with a receive frequency $f_{RX\_B}$ of the second communication standard. The second communication signal 111' comprises the wanted receive signal $s_{RX\_B\_RF}$ and the echoed $n^{th}$ harmonic of the first communication signal 109' echo_$s''_{TX\_A\_RF}$ in the RF domain.

In the example in FIG. 2 the first signal 109 is a wanted transmit signal in the baseband (also designated as $s_{TX\_A}$). The second signal 111 is, in the example shown in FIG. 2, a wanted receive signal in the baseband domain (also designated as $s'_{RX\_B}$).

As part of the signal processing according to the first communication standard the first subunit 101 transforms the first signal 109 from the baseband to a first communication signal 109' in the RF domain. The first subunit 101 derives the first communication signal 109' by upmixing the first signal 109 based on a transmit frequency $f_{TX\_A}$ (also designated as frequency of the transmit signal of the first communication standard) of the first communication standard. Due to the upmixing of the first signal 109 to the first communication signal 109', harmonics of the first signal 109 are generated, which are superpositioned on the first communication signal 109'. An unwanted $n^{th}$ harmonic of the wanted transmit signal 109 in the RF domain is designated as $s''_{TX\_A\_RF}$.

Crosstalk appears if the harmonic of the transmit signal (generated by upmixing the first signal 109 to the first communication signal 109') of the first subunit 101 falls into the receive band of the second communication standard. As an example, the crosstalk condition can be described by the following formula;

$$n \cdot f_{TX\_A} \approx f_{RX\_B}, \quad (1)$$

wherein $f_{TX\_A}$ denotes the frequency of the transmit signal of the first communication standard, $f_{RX\_B}$ denotes the frequency of the transmit signal of the second communication standard and n is a factor to denote the $n^{th}$ harmonic of the transmit signal of the first communication standard.

The control unit 110, which, for example, may be a microprocessor unit, can check whether the condition above is fulfilled while or before the first communication standard transmits or the second communication standard receives. If the crosstalk condition is fulfilled, the control unit 110 or the microprocessor 111 activates the interference cancellation unit 105 (also designated as interferer cancellation unit).

The interference cancellation unit 105 estimates the interference portion or the echo portion 213 (also designated as echo_$s''_{TX\_A\_RF}$) of the first communication signal 109' in the receive band of the second communication standard. Based on this estimation the interference cancellation unit 105 derives the estimated interference signal 107 (also designated as estimated echo signal e'·$s''_{TX\_A\_\Delta f}$). The estimated interference signal 107 is subtracted from the overall receive signal. For example, the estimated interference signal 107 is subtracted from the second signal 111 (also designated as overall receive signal $s'_{RX\_B}$ in the baseband).

The second signal 111 or the overall receive signal in the baseband equals:

$$s'_{RX\_B} = s_{RX\_B} + \text{echo}\_s''_{TX\_A}. \quad (2)$$

In other words, the overall receive signal in the baseband domain comprises the wanted receive signal $s_{RX\_B}$ and the echoed $n^{th}$ harmonic of the first communication signal 109' transferred to the baseband domain.

As mentioned before, the second communication signal 111' comprises the wanted receive signal in the RF domain $s_{RX\_B\_RF}$ and the echoed $n^{th}$ harmonic echo_$s''_{TX\_A\_RF}$ of the first communication signal 109' in the RF domain.

This first communication signal 111' including the echoed harmonic of the first communication signal 109' is downmixed to the first signal 111 from which the estimated interference signal 107 is subtracted to derive an interference free receive signal 111" (also designated as receive signal after echo cancellation $s''_{RX\_B}$).

In other words the interference free receive signal 111" can be derived as the following:

$$s''_{RX\_B} = s'_{RX\_B} - e' \cdot s''_{TX\_A\_\Delta f}. \quad (3)$$

According to further embodiments, in cases, in which the interference cancellation is performed on transmit signals, an interference free transmit signal may be generated. In general, an interference free signal is generated.

As the interference signal 107 is only estimated, the interference free receive signal 111" may be not completely interference free but the interference may be at least reduced by a large amount, for example by 50%, 80%, 90% or 99%.

The control unit 110 activates the interference cancellation unit 105 if a crosstalk condition between the signal processing according to the first communication standard and the signal processing according to the second communication standard is fulfilled.

As an example, the crosstalk condition may be:

$$|n \cdot (f_{TX\_A} +/- 0.5 \cdot f_{BW\_A}) - f_{RX\_B}| \le 0.5 \cdot f_{BW\_B} \quad (4)$$

in which $f_{BW\_A}$ designates the bandwidth of a passband filter for the first communication standard (for example for a transmit path of the first communication standard) and $f_{BW\_B}$ denotes a bandwidth of a passband filter of the second communication standard (for example of a receive path of the second communication standard). Therefore, the control unit 110 may activate the interference cancellation unit 105 if the first communication signal 109' derived from the first signal 109 or a harmonic (for example the $n^{th}$ harmonic) of the first communication signal 109' falls into the passband for the second communication signal 111' based on which the second subunit 103 generates the second signal 111.

The first communication signal 109' and the second communication signal 111' may be independent from each other, in other words the first subunit 101 may be configured to perform the signal processing according to the first communication standard independently from the signal processing according to the second communication standard of the second subunit 103. Vice versa the second subunit 103 may be configured to perform its signal processing independently from the signal processing of the first subunit 101. As an example, the multi-standard transceiver 200 may be configured to communicate according to the first communication standard using the first subunit 101 and simultaneously or concurrently communicate according to the second communication standard using the second subunit 103.

According to further embodiments, for example, a frequency generated in the first subunit 101 may be continuously generated, when the first subunit 101 is activated and may not (or only slightly) vary over time (e.g. a constant clock signal, from an oscillator). The frequency or a harmonic of this frequency may fall into the passband of the second subunit 103, in this case the control unit 110 may activate interference cancellation unit 105 (only) if the first subunit and the second subunit are activated concurrently.

Furthermore, as the multi-standard transceiver 200 may not need to communicate always using both the first subunit 101 and the second subunit 103, the control unit 110 may be configured to selectively activate and deactivate the first subunit 101 and the second subunit 103 and may activate the interference cancellation unit 105 if the first subunit 101 and the second subunit 103 are activated concurrently.

According to further embodiments the first subunit 101 may comprise a first frequency synthesizer 215 to generate a first frequency synthesizer signal having the first synthesizer frequency $f_{TX\_A}$, based on which the subunit 101 performs the signal processing according to the first communication standard. In the example shown in FIG. 2, the first subunit 101 upmixes the first signal 109 to the communication signal 109' using the first synthesizer signal with the first synthesizer frequency $f_{TX\_A}$ as part of the signal processing according to the first communication standard. The first synthesizer frequency $f_{TX\_A}$ can be defined by the first communication standard, wherein one communication standard may have different synthesizer frequencies, for example, for different channels. As an example, the UMTS standard has several UMTS bands, each having its own transmit synthesizer frequency and receive synthesizer frequency. As a further example, if the first communication standard is an FM radio standard, then the first synthesizer frequency $f_{TX\_A}$ can be changed depending on the frequency at which the first signal 109 has to be transmitted.

Furthermore, the second subunit 103 may comprise a second frequency synthesizer 217 configured to generate a second synthesizer signal having the second synthesizer frequency $f_{RX\_B}$, based on which the second subunit 103 performs the signal processing according to the second communication standard. As with the first communication standard and the first subunit 101, the second synthesizer frequency $f_{RX\_B}$ may change depending on a channel or band of the second communication standard used in the second subunit 103.

As the first synthesizer frequency $f_{TX\_A}$ and the second synthesizer frequency $f_{RX\_B}$ may change, the control unit 110 may be configured to survey a relationship between the first synthesizer frequency $f_{TX\_A}$ and the second synthesizer frequency $f_{RX\_B}$ and to activate the interference cancellation unit 105 (only) if the a predetermined condition for the relationship is fulfilled.

As mentioned before, equation 1 shows an example for such a predetermined condition.

As described before, the first subunit 101 may be independent from the second subunit 103. Therefore, the multi-standard transceiver 200 may perform a first communication according to the first communication standard with a first external device using the first subunit 101 and simultaneously perform a second communication according to the second communication standard with a second external device using the second subunit 103.

To give an example, the first communication standard may be an FM radio standard and the second communication standard may be a mobile communication standard, such as UMTS or GSM.

The multi-standard transmitter may transmit data to an FM radio and simultaneously receive data, for example, from a mobile communication base station. As can be seen, performing a communication does not necessarily mean that data has to be transmitted and received, a communication may also be a one-way communication, for example, only receiving data or only transmitting data.

According to further embodiments the first subunit 101 not only may be configured to generate the first communication signal 109', but also to transmit the first communication signal 109' at the transmit frequency $f_{TX\_A}$ of the first communication standard. Furthermore, the second subunit 103 may be configured to generate by reception and amplification the second communication signal 111' at the receive frequency $f_{RX\_B}$ of the second communication standard.

In one embodiment the interference cancellation unit 105 may derive the estimated interference signal 107 such that it describes the echo portion $echo\_s''_{TX\_A\_RF}$ (e.g. falling into the passband of the second communication signal 111') of the first communication signal 109' within the second communication signal 111'.

Furthermore, as already mentioned before, the interference cancellation unit 105 may be configured to subtract the estimated interference signal 107 from the second signal 111 in the baseband, to derive the interference free receive signal 111".

The transmit signal of the first communication standard in the RF domain (the first communication signal 109') can be split into the wanted signal portion $s_{TX\_A\_RF}$ and the unwanted $n^{th}$ harmonic signal portion $s''_{TX\_A\_RF}$. The receive signal (the second communication signal 111') in the RE band of the second communication standard comprises the wanted receive signal $s_{RX\_B\_RF}$ and the echo of the $n^{th}$ harmonic of the transmit signal or the first communication signal 109' called $echo\_s''_{TX\_A\_RF}$. It is assumed that the echo of the wanted signal $s_{TX\_A\_RF}$ does not fall into the frequency band of the second communication standard. In this example, this echo portion can be ignored.

The echo cancellation unit E or the interference cancellation unit 105 estimates the echo portion of the transmit signal via correlation (in the baseband) of the received signal $s''_{RX\_B}$ (the interference free receive signal 111") with the frequency shifted $n^{th}$ harmonic of the wanted transmit signal $s_{TX\_A}$. The estimated echo within the frequency band of the second communication standard is subtracted from the overall receive signal $s'_{RX\_B}$ (the second signal 111).

In case of an ideal echo cancellation and after attenuation of unwanted out of band components, for example using a filter 219 of the first subunit 103, a signal $s'''_{RX\_B}$ only contains the wanted portion of the receive signal $s_{RX\_B}$.

In other words, interference cancellation unit 105 may be configured to derive an echo transfer function e' (also designated as echo coefficient e') describing a coupling between the first communication signal 109' transmitted by the first subunit 101 and the second communication signal 111' received by the second subunit 103. The interference cancellation unit 105 may update the echo transfer function e' in response to changes of the coupling between the first communication signal 109' and the second communication signal 111' and may derive the estimated interference signal 107 based on the echo transfer function e'. As an example, a transmission characteristic or a propagation path between the first subunit 101 and the second subunit 103 may change and therefore the echo portion 213 of the first communication signal 109' in the second communication signal 111' may change and the interference cancellation unit 105 may adapt the echo transfer function e' in response to such a change of the echo portion 213 based on the correlation between the interference free receive signal 111" and a frequency shifted harmonic $s''_{TX\_A\_\Delta f}$ of the communication signal 109' in the baseband.

In other words, the interference cancellation unit 105 may be configured to derive an $n^{th}$ harmonic of the first communication signal 109' in the baseband, the $n^{th}$ harmonic of the first communication signal 109' falling into the passband for the second communication signal 111'. The interference cancellation unit 105 may derive the estimated interference signal 107 by combining (in the baseband) the echo coefficient or the echo transfer function e' and the $n^{th}$ harmonic $s''_{TX\_A\_\Delta f}$ of the first communication signal 109' in the baseband. According to an embodiment the interference cancellation unit 105 may fold the echo transfer function e' and the $n^{th}$ harmonic $s''_{TX\_A\_\Delta f}$ of the first communication signal 109' in the baseband to derive the estimated interference signal 107.

Furthermore, the interference cancellation unit 105 may be configured to derive the echo coefficient or the echo transfer function e' by calculating (in the baseband) a correlation based on the $n^{th}$ harmonic $s''_{TX\_A}$ of the first communication signal 109' in the baseband and on the interference free receive signal 111" in the baseband. By performing the correlation in the baseband, instead of performing the correlation in the RF domain, a calculation effort can be dramatically reduced.

Furthermore, the interference cancellation unit 105 may be configured to frequency shift the $n^{th}$ harmonic $s''_{TX\_A}$ (in the baseband) based on a difference between n times the transmit frequency $f_{TX\_A}$ and the receive frequency $f_{RX\_B}$. In other words:

$$\Delta f = n \cdot f_{TX\_A} - f_{TX\_B}. \quad (5)$$

Accordingly, the frequency shifted $n^{th}$ harmonic of the wanted transmit signal A (of the first signal 109) is defined as:

$$s''_{TX\_A\_\Delta f} = s''_{TX\_A} \cdot \cos(2\pi\Delta f t). \quad (6)$$

The frequency shifted $n^{th}$ harmonic $s''_{TX\_A\_\Delta f}$ describes the harmonic $S''_{TX\_A\_RF}$ within the first communication signal 109' in the RF domain.

According to further embodiments, the first subunit 101 may comprise a transmit filter, a passband of which is adapted to a transmit frequency band of the first communication standard and a receive filter, a passband of which is adapted to a receive frequency band of the first communication standard. The transmit frequency band of the first communication standard may be different from the receive frequency of the second communication standard.

Furthermore, the second subunit 103 may comprise a transmit filter, a passband of which is adapted to a transmit frequency of the second communication standard and a receive filter, a passband of which is adapted to a receive frequency of the second communication standard.

The transmit frequency of the second communication standard may be different from the receive frequency of the second communication standard.

Furthermore, the first subunit 101 may be configured to generate the first communication signal 109', wherein the maximum amplification for the first communication 100' is chosen such that a maximum power of a first communication signal 109' is equal or below an upper limit for the power defined by the first communication standard.

Furthermore, the second subunit 103 may be configured to generate the communication signal $s_{TX\_B\_RF}$ according to the second communication standard and a maximum amplification for this communication signal $s_{TX\_B\_RF}$ (for example as a transmit signal) may be chosen such that a maximum power of this communication signal $s_{TX\_B\_RF}$ is equal to or below an upper limit for the power defined by the second communication standard.

As an example the first communication standard may be a Bluetooth standard and the second communication standard may be a GSM standard. A maximum output power for the Bluetooth standard is typically lower than a maximum output power for the GSM standard. Therefore, in a transmit path of the first subunit 101 a lower amplification is performed than in a transmit path of the second subunit 103.

In other words, an upper limit for the power defined by the first communication standard may be different from the upper limit for the power defined by the second communication standard.

According to further embodiments the first communication standard may be a first RF (radio frequency) communication standard and the second communication standard may be a second RF communication standard.

The multi-standard transceiver 200 may be configured to communicate simultaneously using the first RF communication standard and the second RF communication standard.

Furthermore, the first subunit 101 may be configured to transmit and receive signals. Furthermore, the second subunit 103 may be configured to transmit and receive signals.

Typically, a transfer characteristic or a propagation path between the first subunit 101 and the second subunit 103 changes slowly. Therefore, according to further embodiments, the calculation of a change of the echo coefficient or the echo transfer function e' can be performed by averaging the instantaneous correlation between the frequency shifted $n^{th}$ harmonic $s''_{TX\_A\_\Delta f}$ and the receive signals 111". According to some embodiments the echo coefficient or the echo transfer function e' may be a filter.

To summarize, the multi-standard transceiver 200 comprises the control unit 110 (for example a microprocessor) and the subunits A, B for the various communication standards A and B, for example for various mobile phone standards A and B.

The example in FIG. 2 has the advantage of a low current consumption and a low bill of material, due to no needed external components. The interferer signal (the estimated interference signal 107) can be estimated and subtracted in the baseband frequency domain, i.e. the data rate of the interference cancellation unit 105 is low.

The control unit 110 checks whether the harmonics of the transmit signal of the subunit A (the first subunit 101) fall into the receive band of the subunit B (the second subunit 103).

If the crosstalk condition is fulfilled, the interference cancellation unit 105 estimates the interferer portion of the transmit signal A within the receive band of the second subunit 103. The estimated interferer signal (the estimated interference signal 107) is subtracted from the overall receive signal 111' of the second subunit 103.

Harmonics of the transmit signal do not appear anymore in the receive part of the second subunit 103.

The multi-standard transceiver 200 may be applied for both wireless applications (for example like mobile phone applications) and wire line applications.

In the example shown in FIG. 2 the transmit frequency $f_{TX\_A}$ of the first subunit 101 and the receive frequency $f_{RX\_B}$ of the second subunit 103 are sent to the control unit or microprocessor unit 111. If the crosstalk condition is fulfilled, i.e. the $n^{th}$ harmonic of the transmit signal A (of the first communication signal 109') falls into the receive band of the second communication standard, the echo cancellation unit or the interference cancellation 105 is activated.

The multi-standard transceiver 200 can be used for both multi-standard mobile phone and multi-standard wire line communication systems. Furthermore, deterministic spurs or harmonic carrier signals can also be cancelled following the approach described in conjunction with FIG. 2. In other words, embodiments enable the cancellation of deterministic spurs or harmonic carrier signals.

In the following, additional embodiments will be described in short, covering additional aspects.

There may be cases in which a first subunit may transmit a communication signal and a second subunit may receive a communication signal, and the first subunit or the second subunit may generate an interference in the other subunit, independent of the communication standards used by the subunits. Hence, an interference cancellation can also be advantageous in cases in which an interference occurs independent from different communication standards.

Figure 3:
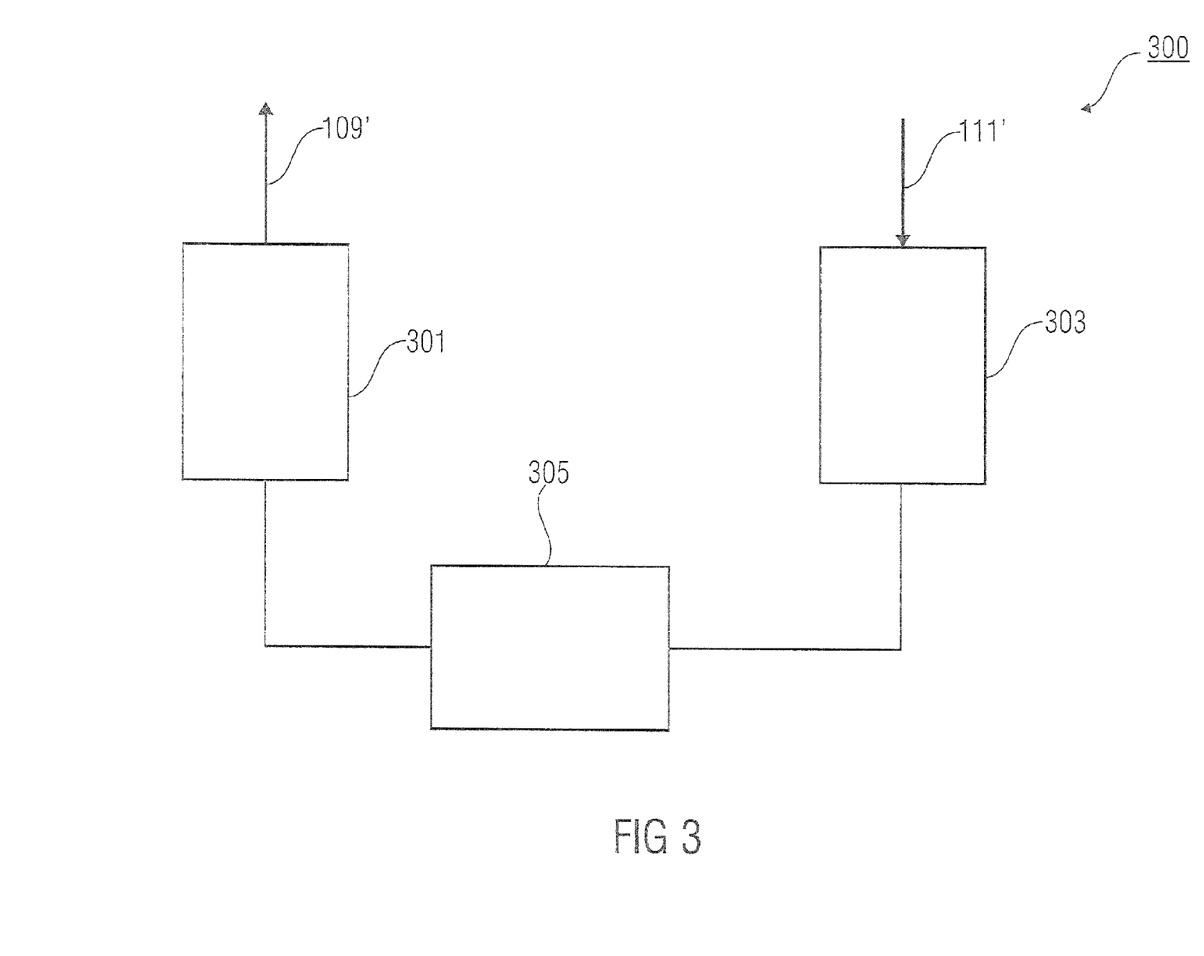
FIG. 3 a block schematic diagram of a device as an embodiment according to a second aspect.

FIG. 3 shows a device 300 which covers this aspect.

The device 300 comprises a first subunit 301 configured to transmit a first communication signal 109' at a transmit frequency $f_{TX\_A}$. Furthermore, the device 300 comprises a second subunit 303 configured to receive a second communication signal 111' at a receive frequency $f_{RX\_B}$.

Furthermore, the device 300 comprises an interference cancellation unit 305.

The interference cancellation unit 305 is configured to survey a relationship between the transmit frequency and the receive frequency and to activate interference cancellation if the relationship fulfills a predetermined condition. As an example, the predetermined condition may be equal to equation 4 mentioned above.

According to further embodiments, the first subunit 301 and the second subunit 303 may be configured such that a relationship between the transmit frequency $f_{TX\_A}$ and the receive frequency $f_{RX\_B}$ varies.

Of course, the first communication signal 109' and the second communication signal 111' may be from different communication standards, but may also be from the same communication standard. As an example, the first subunit 301 may transmit the first communication signal 109' in a first UMTS band and the second subunit 303 may receive the second communication signal 111' in a second UMTS communication band. The transmit frequency $f_{TX\_A}$ of the first UMTS band may fall into a receive passband for the second communication signal 111' defined by a standard for the second UMTS band used in the subunit 303.

Furthermore, as an example for two different communication standards, the first communication signal 109' may be an FM radio transmit signal with a transmit frequency $f_{TX\_A}$ of 104 MHz and the second communication signal 111' may be a GSM receive signal with a receive frequency of $f_{RX\_B}$ of 936 MHz. In this case, the $9^{th}$ harmonic of the first communication signal 109' would couple via an FM radio antenna to an GSM antenna and reduce the sensitivity of the second communication signal 111'. Hence, the first subunit 301 may be configured according to a first communication standard and the second subunit 303 may be configured according to a second communication standard.

In both cases mentioned above the interference cancellation unit detects that the relationship fulfills the predetermined condition and may activate the interference cancellation.

Furthermore, the device 300 may comprise additional features like it has been described in conjunction with the multi-standard transceiver 200 according to FIG. 2. In other words, the features described in conjunction with the multi-standard transceiver 200 may be applicable to the device 300 as well.

Furthermore, there may be devices comprising two or more subunits, each subunit being configured to transmit and receive a communication signal.

Figure 4:
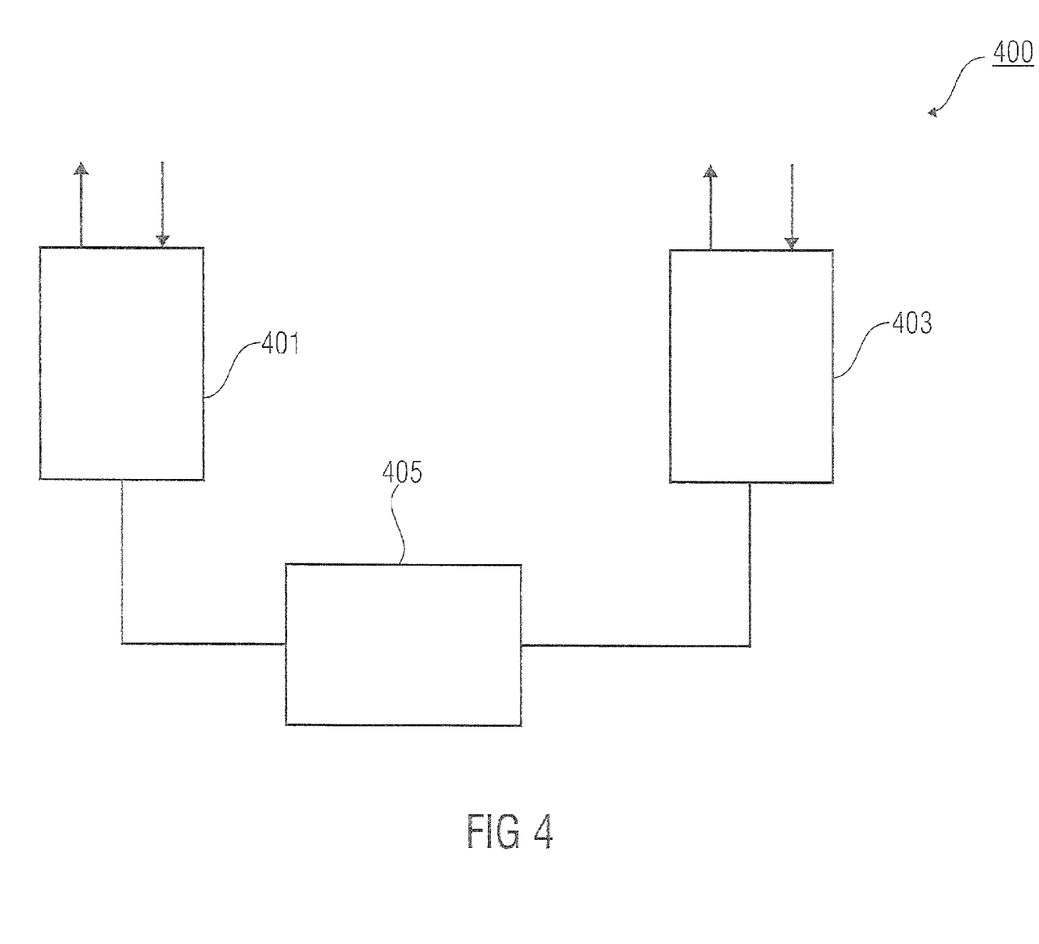
FIG. 4 a block schematic diagram of a device as an embodiment according to a third aspect.

FIG. 4 shows such an example with a device 400 comprising a first transceiver subunit 401 and a second transceiver subunit 403. Furthermore, the device 400 comprises an interference cancellation unit 405 coupled between the first transceiver subunit 401 and the second transceiver subunit 403. The interference cancellation unit 405 may be configured to perform an interference cancellation between the first transceiver subunit 401 and the second transceiver subunit 403, for example, in both directions, i.e. the interference cancellation unit 405 may reduce an interference generated by the second transceiver subunit 403 in the first transceiver subunit 401 and an interference generated by the first transceiver subunit 401 in the second transceiver subunit 403.

Furthermore, the device 400 may comprise additional features, for example features described in conjunction with the multi-standard transceiver 200. In other words, the features described in conjunction with the multi-standard transceiver 200 may be applicable to the device 400 as well.

Furthermore, there may be cases in which a signal processing from one subunit interferes with a signal processing of a second subunit (always or only) when both of the subunits are activated.

Figure 5:
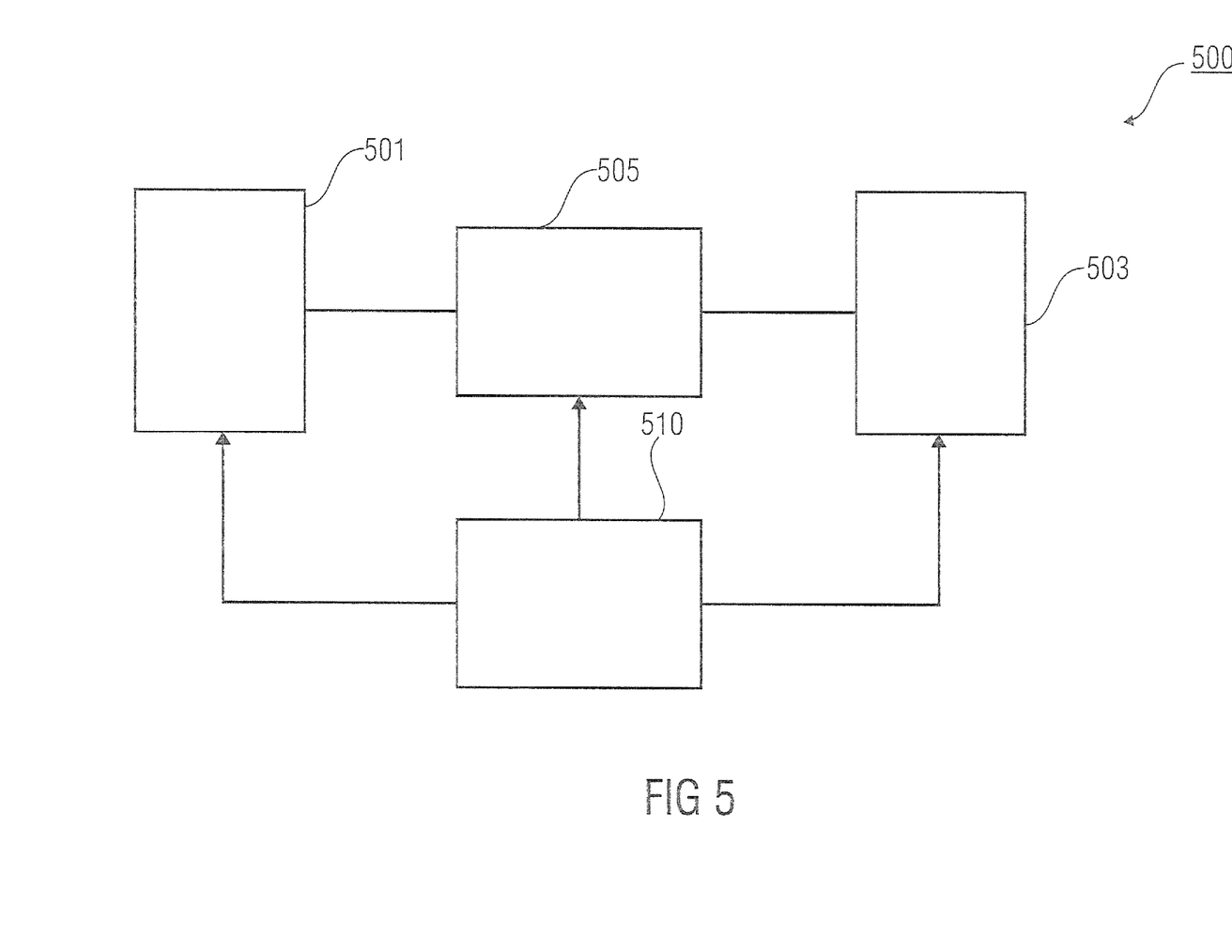
FIG. 5 a block schematic diagram of a device as an embodiment according to a fourth aspect.

For this case, FIG. 5 shows a device 500 comprising a plurality of subunits 501, 503. Each of the subunits is configured to perform signal processing.

Furthermore, the device 500 comprises an interference cancellation unit 505 coupled between the plurality of subunits 501, 503 and a control unit 510 to selectively activate and deactivate each of the subunits 501, 503 and to activate the interference cancellation unit 505, if a combination of active subunits fulfills a predetermined condition.

As an example, the control unit 510 may activate the interference cancellation unit 505 if the first active subunit performs a signal processing, which interferes with the signal processing of a second active subunit. Furthermore, the device 500 may comprise subunits which can be active simultaneously and wherein no interference appears, such that the control unit 510 may not activate the interference cancellation unit 505 if these subunits are active.

Although, in the example of FIG. 5 only two subunits are shown, according to further embodiments, the device 500 may comprise an arbitrary number of subunits.

Figure 6:
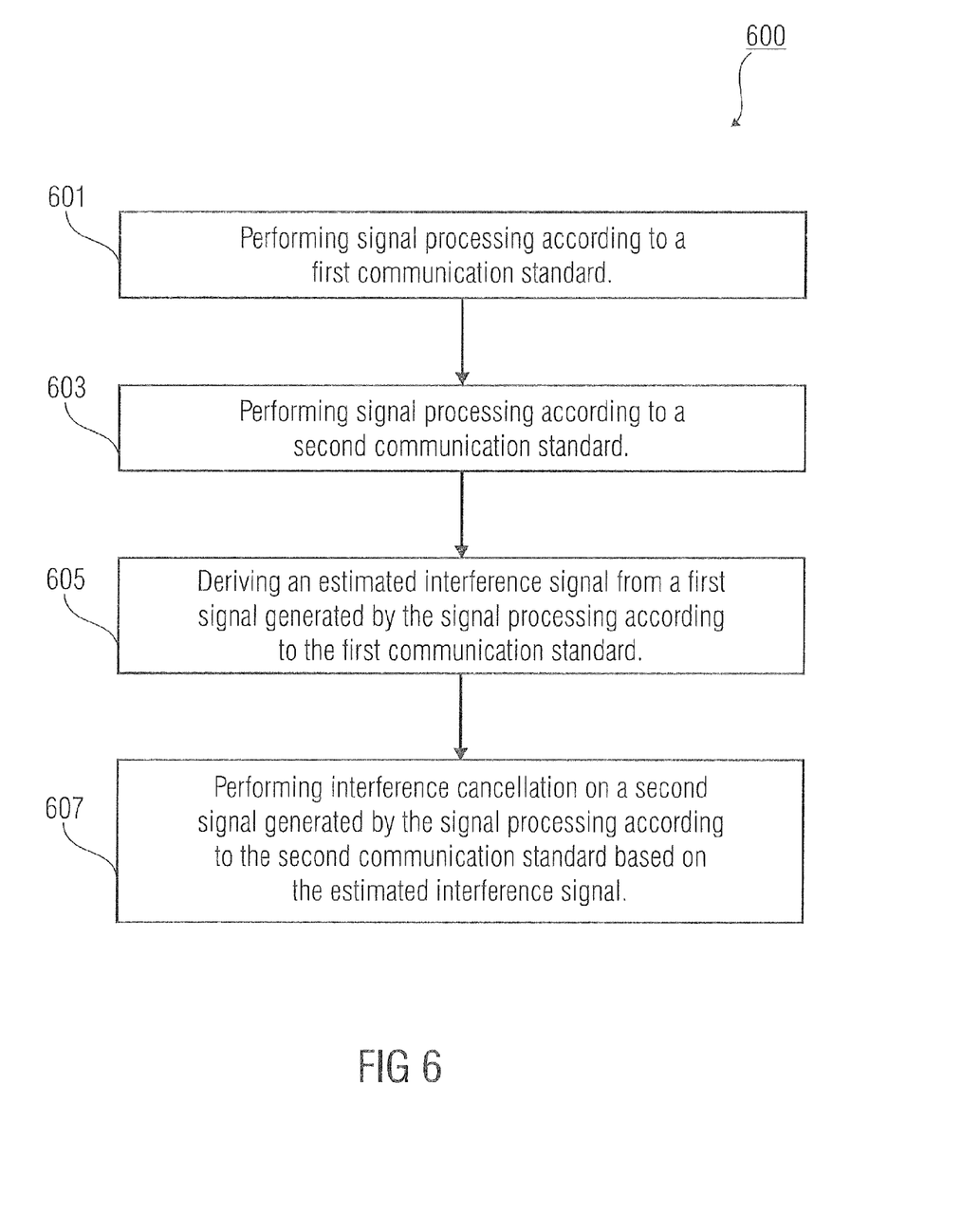
FIG. 6 a flow diagram of a method according to an embodiment, which, for example, may be performed by the multi-standard transceiver from FIG. 1.

The device 500 may comprise additional features, for example, features which have been described in conjunction with the multi-standard transceiver 200. In other words, the features described in conjunction with the multi-standard transceiver 200 may be applicable to the device 500 too FIG. 6 shows a flow diagram of a method 600 according to an embodiment.

The method 600 comprises a step 601 of performing signal processing according to a first communication standard.

Furthermore, the method 600 comprises a step 603 of performing signal processing according to a second communication standard.

Furthermore, the method 600 comprises a step 605 of deriving an estimated interference signal from a first signal generated by the signal processing according to the first communication standard.

Furthermore, the method 600 comprises a step 607 of performing interference cancellation on a second signal generated by the signal processing according to the second communication standard based on the estimated interference signal.

The method 600 may be performed by the multi-standard transceiver 100 or the multi-standard transceiver 200. Furthermore, the steps of the method 600 may be performed simultaneously or concurrently, such that the interference cancellation is performed during the signal processing according to the first communication standard and the signal processing according to the second communication standard.

Figure 7:
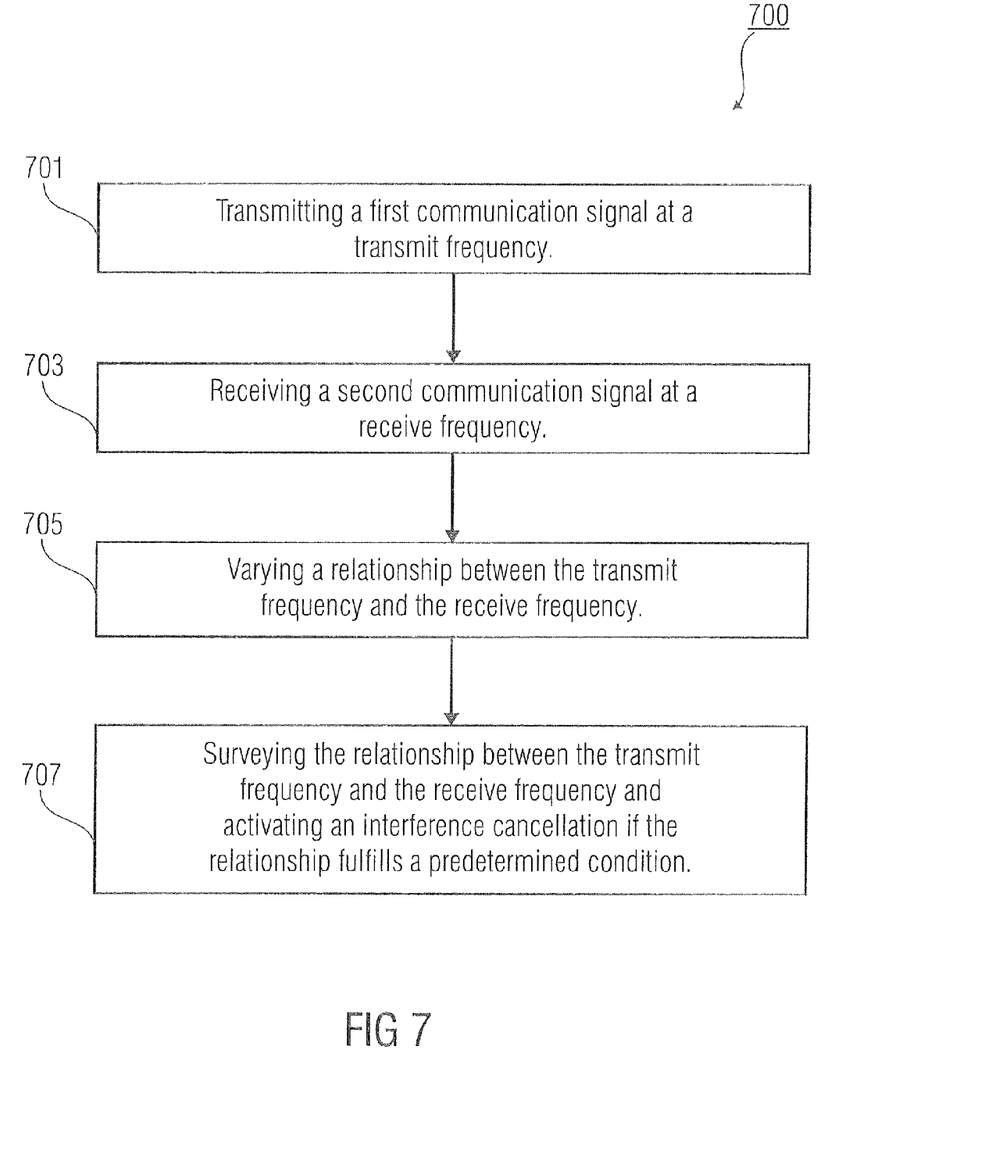
FIG. 7 a flow diagram of a method according to an embodiment, which, for example, may be performed by the device from FIG. 3.

FIG. 7 shows a flow diagram of a method 700 according to a further embodiment of the present invention.

The method 700 comprises a step 701 of transmitting a first communication signal at a transmit frequency.

Furthermore, the method 700 comprises a step 703 of receiving a second communication signal at a receive frequency.

Furthermore, the method 700 may comprise an optional step 705 of varying a relationship between the transmit frequency and the receive frequency.

Furthermore, the method 700 comprises a step 707 of surveying the relationship between the transmit frequency and the receive frequency, and activating an interference cancellation if the relationship fulfills a predetermined condition.

The method 700 may be performed by the device 400. Furthermore, the steps of the method 700 may be performed simultaneously or concurrently, such that the interference cancellation is activated during the transmission of the first communication signal and reception of the second communication signal, simultaneously.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable non-transitory carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A multi-standard transceiver comprising:
   a first subunit configured to perform signal processing according to a first communication standard;

a second subunit configured to perform signal processing according to a second communication standard; and an interference cancellation unit configured to derive an estimated interference signal from a first signal generated by the first subunit by performing the signal processing according to the first communication standard, and perform interference cancellation on a second signal generated by the second subunit by performing the signal processing according to the second communication standard based on the estimated interference signal;

wherein the interference cancellation unit is configured to derive an echo transfer function describing a leakage of the first signal into the second signal in a baseband of the first subunit, derive the estimated interference signal based on the echo transfer function, and subtract the estimated interference signal from the second signal in a baseband of the second subunit.

2. The multi-standard transceiver according to claim 1, further comprising a control unit configured to activate and deactivate the interference cancellation unit; and wherein the control unit is configured to activate the interference cancellation unit if a crosstalk condition between the signal processing according to the first communication standard and the signal processing according to the second communication standard is fulfilled.

3. The multi-standard transceiver according to claim 2, wherein the control unit is configured to activate the interference cancellation unit if a first communication signal derived from the first signal or a harmonic of the first communication signal falls into a passband of a second communication signal based on which the second subunit generates the second signal.

4. The multi-standard transceiver according to claim 1:

wherein the first subunit is configured to perform the signal processing independently from the signal processing of the second subunit; and wherein the second subunit is configured to perform the signal processing independently from the signal processing of the first subunit.

5. The multi-standard transceiver according to claim 1, further comprising a control unit configured to selectively activate and deactivate the first subunit and the second subunit, and activate the interference cancellation unit if the first subunit and the second subunit are activated concurrently.

6. The multi-standard transceiver according to claim 1, further comprising a control unit;

wherein the first subunit comprises a first frequency synthesizer configured to generate a first synthesizer signal having a first synthesizer frequency based on which the first subunit performs the signal processing according to the first communication standard;

wherein the second subunit comprises a second frequency synthesizer configured to generate a second synthesizer signal having a second synthesizer frequency based on which the second subunit performs the signal processing according to the second communication standard; and wherein the control unit is configured to survey a relationship between the first synthesizer frequency and the second synthesizer frequency, and activate the interference cancellation unit if the relationship fulfills a predetermined condition.

7. The multi-standard transceiver according to claim 1, configured to perform a first communication according to the first communication standard with a first external device using the first subunit, and simultaneously perform a second communication according to the second communication standard with a second external device using the second subunit.

8. The multi-standard transceiver according to claim 1, wherein the first subunit is configured to generate a first communication signal according to the first communication standard, and transmit the first communication signal at a transmit frequency of the first communication standard; and wherein the second subunit is configured to generate by reception and amplification a second communication signal at a receive frequency of the second communication standard, and perform the signal processing according to the second communication standard based on the second communication signal; and wherein the interference cancellation unit is configured to derive the estimated interference signal such that it describes an echo portion of the first communication signal within the second communication signal.

9. The multi-standard transceiver according to claim 1, wherein the first subunit is configured to upmix the first signal from a baseband to a transmit frequency of the first communication standard to derive a first communication signal; and wherein the interference cancellation unit is configured to derive the estimated interference signal from the first signal in the baseband.

10. The multi-standard transceiver according to claim 9:

wherein the second subunit is configured to derive the second signal by downmixing a second communication signal from a receive frequency of the second communication standard to the baseband; and wherein the interference cancellation unit is configured to subtract the estimated interference signal from the second signal in the baseband, to derive a substantially interference free receive signal.

11. The multi-standard transceiver according to claim 1, wherein the interference cancellation unit is configured to derive an echo transfer function describing a coupling between a first communication signal transmitted by the first subunit and a second communication signal received by the second subunit, update the echo transfer function in response to changes of the coupling between the first communication signal and the second communication signal, and derive the estimated interference signal based on the echo transfer function.

12. The multi-standard transceiver according to claim 1:

wherein the first subunit comprises a transmit filter, a passband of which is adapted to a transmit frequency band of the first communication standard and a receive filter, a passband of which is adapted to a receive frequency band of the first communication standard; and wherein the second subunit comprises a transmit filter, a passband of which is adapted to a transmit frequency band of the second communication standard and a receive filter, a passband of which is adapted to a receive frequency band of the second communication standard.

13. The multi-standard transceiver according to claim 1:

wherein the first subunit is configured to generate a first communication signal according to the first communication standard;

wherein a maximum amplification for the first communication signal is chosen such that a maximum power of the first communication signal is equal or below an upper limit for the power defined by the first communication standard;

wherein the second subunit is configured to generate a second communication signal according to the second communication standard; and
wherein a maximum amplification for the second communication signal is chosen such that a maximum power of the second communication signal is equal to or below an upper limit for the power defined by the second communication standard.

14. The multi-standard transceiver according to claim 13, wherein the upper limit for the power defined by the first communication standard is different from the upper limit for the power defined by the second communication standard.

15. The multi-standard transceiver according to claim 1, wherein the first communication standard is a first RF communication standard and the second communication standard is a second, different RF communication standard.

16. The multi-standard transceiver according to claim 15, configured to communicate simultaneously or concurrently using the first RF communication standard and the second RF communication standard.

17. A multi-standard transceiver comprising:
a first subunit configured to perform signal processing according to a first communication standard;
a second subunit configured to perform signal processing according to a second communication standard; and
an interference cancellation unit configured to derive an estimated interference signal from a first signal generated by the first subunit by performing the signal processing according to the first communication standard, and perform interference cancellation on a second signal generated by the second subunit by performing the signal processing according to the second communication standard based on the estimated interference signal,
wherein the interference cancellation unit is configured to derive an echo transfer function describing a coupling between a first communication signal transmitted by the first subunit and a second communication signal received by the second subunit, update the echo transfer function in response to changes of the coupling between the first communication signal and the second communication signal, and derive the estimated interference signal based on the echo transfer function, and
wherein the interference cancellation unit is configured to derive an n-th harmonic of the first communication signal in the baseband, the n-th harmonic of the first communication signal falling into a passband of the second communication signal, and derive the estimated interference signal by combining the echo transfer function and the n-th harmonic of the first communication signal in the baseband.

18. The multi-standard transceiver according to claim 17, wherein the interference cancellation unit is configured to derive the echo transfer function by calculating a correlation based on the n-th harmonic of the first communication signal in the baseband and on an interference free receive signal derived by subtracting the estimated interference signal from the second signal.

19. The multi-standard transceiver according to claim 18, wherein the interference cancellation unit is configured to frequency shift the n-th harmonic of the first communication signal in the baseband based on a difference between n-times the transmit frequency and the receive frequency.

20. A method, comprising:
performing signal processing according to a first communication standard to provide a first signal;
performing signal processing according to a second communication standard to provide a second signal;
deriving an estimated interference signal from the first signal generated by the signal processing according to the first communication standard;
performing interference cancellation on the second signal generated by the signal processing according to the second communication standard based on the estimated interference signal;
deriving an echo transfer function describing a leakage of the first signal into the second signal in a baseband of the first communication standard;
deriving the estimated interference signal based on the echo transfer function; and
subtracting the estimated interference signal from the second signal in a baseband of the second communication standard.

21. A computer readable digital non-transitory storage medium having stored thereon a computer program having a program code for performing, when running on a computer, the method comprising:
performing signal processing according to a first communication standard to provide a first signal;
performing signal processing according to a second communication standard to provide a second signal;
deriving an estimated interference signal from the first signal generated by the signal processing according to the first communication standard;
performing interference cancellation on the second signal generated by the signal processing according to the second communication standard based on the estimated interference signal;
deriving an echo transfer function describing a leakage of the first signal into the second signal in a baseband of the first communication standard;
deriving the estimated interference signal based on the echo transfer function; and
subtracting the estimated interference signal from the second signal in a baseband of the second communication standard.

22. A multi-standard transceiver, comprising:
a first subunit configured to perform signal processing according to a first communication standard, and generate a first signal by performing the signal processing according to the first communication standard;
a second subunit configured to perform signal processing according to a second communication standard, and generate a second signal by performing the signal processing according to the second communication standard;
an interference cancellation unit; and
a control unit configured to activate and deactivate the interference cancellation unit;
wherein the first subunit comprises a first frequency synthesizer configured to generate a first synthesizer signal having a first synthesizer frequency, and wherein the first subunit is configured to upmix the first signal from a baseband to the first synthesizer frequency to derive a first communication signal;
wherein the second subunit comprises a second frequency synthesizer configured to generate a second synthesizer signal having a second synthesizer frequency, and wherein the second subunit is configured to downmix the second communication signal using the second synthesizer frequency to the baseband;
wherein the control unit is configured to survey a relationship between the first synthesizer frequency and the second synthesizer frequency, and activate the interference cancellation unit if a predetermined condition for the relationship is fulfilled; and wherein the interference cancellation unit is configured to derive an n-th harmonic of the first communication signal in the baseband, the n-th harmonic of the first communication signal falling into a passband of the second signal, to, in the baseband, frequency shift the n-th harmonic of the first communication signal in the baseband based on a relationship between the first synthesizer frequency and the second synthesizer frequency, derive an echo transfer function describing a coupling between the first communication signal and the second communication, by calculating, in the baseband, a correlation based on the frequency shifted n-th harmonic of the first communication signal in the baseband and on an interference free signal, update the echo transfer function in response to changes of the coupling between the first communication signal and the second communication signal, derive the estimated interference signal by combining, in the baseband, the echo transfer function with the frequency shifted n-th harmonic of the first communication signal in the baseband, and perform an interference cancellation on the second signal by subtracting, in the baseband, the estimated interference signal from the second signal, to derive, as a result of the interference cancellation, a substantially interference free signal.

* * * * *